E. J. McCarthy,
Paddle Wheel.
Nº 5,405.                    Patented Dec. 28, 1847.
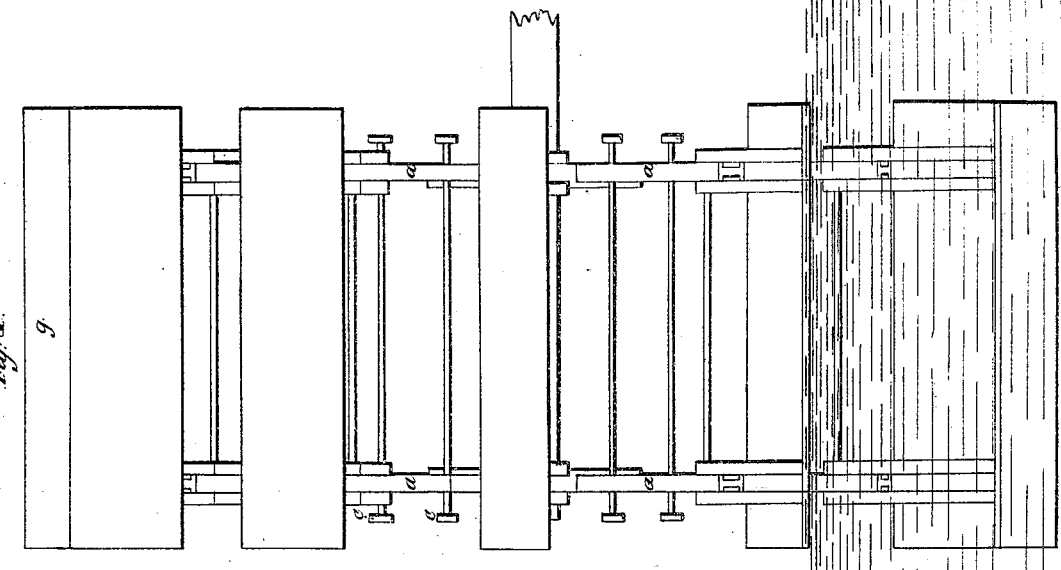
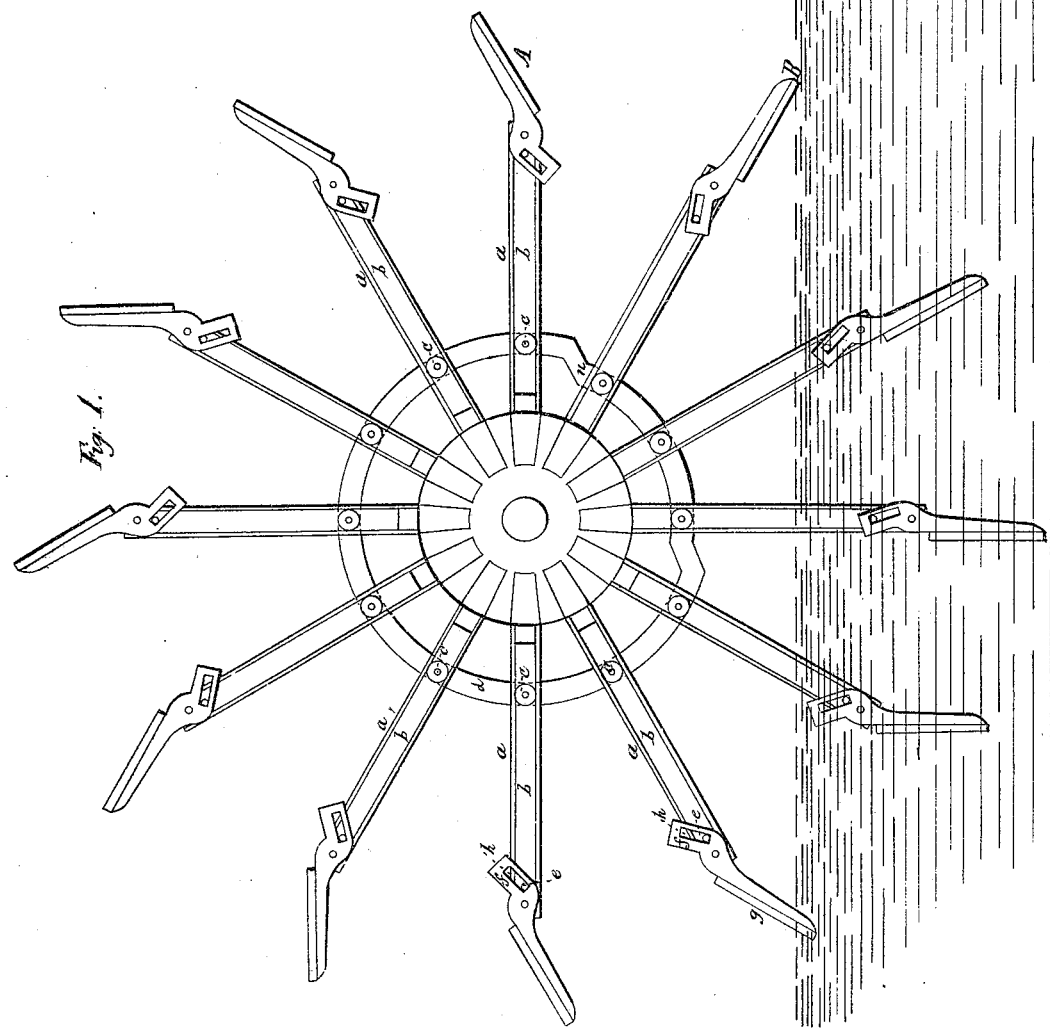

UNITED STATES PATENT OFFICE.

E. J. McCARTHY, OF SAUGERTIES, NEW YORK.

IMPROVEMENT IN PADDLE-WHEELS.

Specification forming part of Letters Patent No. 5,405, dated December 28, 1847.

*To all whom it may concern:*

Be it known that I, E. J. McCARTHY, of Saugerties, in the county of Ulster and State of New York, have invented new and useful Improvements in Paddle-Wheels for Steamboats and other Purposes; and I do hereby declare that the following is a full, clear, and exact description of the principle or character which distinguishes them from all other things before known and of the manner of making, constructing, and using the same, reference being had to the accompanying drawings, making part of this specification, in which—

Figure 1 is a side elevation, and Fig. 2 a front view, of the wheel.

The same letters indicate like parts in both the figures.

The nature of my invention consists in so regulating the movement of a bucket relatively to the wheel as that it shall enter the water radially, or nearly so, and as it rises from the water allowing its point to fall back, so as to relieve it from the lift the common radial paddle is subject to at that point, the action being produced without any strain on the parts that allow the movement.

The construction is as follows: Each of the arms $a$ of the wheel is made with a groove on each side of it, in which a bar $b$ rests and slides. The inner end of said bar has a stud projecting from it, on which a friction-roller $c$ turns. This roller runs in a groove $d$. (Shown in the drawings by red lines, and which will be more particularly alluded to in the description of the operation of the wheel.) The lower end of said bar is connected by a stud $e$ with a movable brace $f$, to which the paddle is attached, said brace being jointed to the end of the arm about its center. The outer end of the brace has the paddle-board $g$ affixed to it, and above where it is jointed to the arm it is bent backward a little, as is clearly shown in Fig. 1. On the end of the brace opposite the paddle-board an elongated slit $h$ is made diagonally across the arm, in which the stud $e$ works as the bar $b$ slides in and out. By this arrangement it will be seen that as the bar $b$ is drawn inward toward the center of the wheel the paddle-board is brought into a radial position, and when said bar is thrust outward it causes the paddle to incline backward.

The operation of the wheel is as follows: The paddle descends toward the water in the revolution in a position inclining backward, as represented at A, Fig. 1, till it arrives near the water. The bar $b$ is then drawn in by an eccentric $n$ in the groove, which is shown in red lines in Fig. 1, as previously alluded to. By drawing in the bar $b$ the paddle is straightened out to a radial line, as shown at B, Fig. 1, in which position it enters the water and passes through it until the arm arrives at a vertical position. As soon as it passes that line the bar is gradually thrust out by the groove above referred to, aided by the action on the paddle, which is thus again brought into the inclined position first described, and thence it moves round in the same relative position to the arm till it is again brought to enter the water. This construction and arrangement of parts, it will be seen, relieves the groove and connections of all strain, the paddle being forced back by the water and impelled forward in a degree by its own weight.

Having thus fully described my improvement, I wish it to be understood that I do not claim movable paddles, as they have before been made and worked in many different ways; but

What I do claim as my invention, and desire to secure by Letters Patent, is—

The construction and arrangement of the apparatus for moving the paddles, substantially as described, consisting of a sliding bar $b$, moved by an eccentric that is connected by means of a stud $e$ with a slit in jointed brace $f$, to which the paddle is affixed, so as to cause the paddles to enter the water radially and thus remain to the center of their action and then to fall back into an inclined position and leave the water freely, the action of the paddle aiding the change.

E. J. McCARTHY.

Witnesses:
J. H. THAYER,
J. J. GREENOUGH.